(12) United States Patent
Scholz et al.

(10) Patent No.: US 6,457,804 B1
(45) Date of Patent: Oct. 1, 2002

(54) SPRING FOR LATCHING A PRINT CARTRIDGE IN A CARRIAGE

(75) Inventors: Marcus Scholz, San Diego; Daniel S. Kline, Encinitas; Junji Yamamoto; Ram Santhanam, both of San Diego, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/558,308

(22) Filed: Apr. 25, 2000

(51) Int. Cl.[7] .............. B41J 23/00; B41J 2/14; B41J 2/16; F16F 1/18
(52) U.S. Cl. .............. 347/37; 347/49; 347/50; 267/158
(58) Field of Search ............... 347/37, 49, 50, 347/56, 138, 86; 267/158, 160

(56) References Cited

U.S. PATENT DOCUMENTS

| | | | |
|---|---|---|---|
| 4,706,097 A | 11/1987 | Harmon | 346/139 C |
| 4,755,836 A | 7/1988 | Ta et al. | 347/49 |
| 4,872,026 A | 10/1989 | Rasmussen et al. | 347/56 |
| 4,907,018 A | 3/1990 | Pinkerpell et al. | 346/139 R |
| 5,106,586 A | * 4/1992 | Muszak et al. | 422/99 |
| 5,392,063 A | 2/1995 | Rhoads | 347/40 |
| 6,135,587 A | * 10/2000 | Mulh et al. | 347/49 |

* cited by examiner

*Primary Examiner*—John Barlow
*Assistant Examiner*—Alfred E Dudding

(57) ABSTRACT

A spring for latching a print cartridge in a carriage in a facsimile printer mechanism. The spring is a cantilever that is doubled back on itself to obtain a long effective length is a short space.

11 Claims, 6 Drawing Sheets

SPRING FOR LATCHING A PRINT
CARTRIDGE IN A CARRIAGE

RELATED APPLICATION

This application is related to the following copending utility patent application, each filed concurrently on Apr. 25, 2000: Ser. No.: 09/557,447 by McArdle, et al., entitled, "Apparatus for Aligning A Flexible Circuit On An Ink Jet Printer Carriage".

FIELD OF THE INVENTION

The present invention generally relates to printers in facsimile machines and, more particularly, to the apparatus for mounting print cartridges in these printers for facsimile printing.

BACKGROUND OF THE INVENTION

The general design and construction of carriages that retain and align print cartridges in printers and scan these print cartridges through print zones is well known. Examples of the patents that have issued in the field of ink jet printing technology include:

U.S. Pat. No. 4,755,836 entitled "Printhead Cartridge and Carriage Assembly" by Ta et al. issued Jul. 5, 1988;

U.S. Pat. No. 4,872,026 entitled "Ink-jet Printer with Printhead Carriage Alignment Mechanism" by Rasmussen et al. issued Oct. 3, 1989;

U.S. Pat. No. 4,907,018 entitled "Printhead-Carriage Alignment and Electrical Interconnect Lock-in Mechanism" by Pinkerpell issued Mar. 6, 1990; and U.S. Pat. No. 5,392,063 entitled "Spring Cartridge Clamp for Inkjet Printer Carriage" by Rhoads issued Feb. 21, 1995.

Prior facsimile machines have proven to be quite satisfactory; however it is believed that facsimile users want a facsimile machine with a smaller profile. In other words, users wish to reproduce all of the currently available facsimile functions in a product of reduced size. This desire has resulted in a need for a smaller printer and with it, a smaller carriage.

Such requirements result in numerous design challenges. First, the forces that a user must exert for the insertion and removal of a print cartridge from a carriage must be kept within an acceptable range, that is to say, to be as small and as comfortable as possible. Second, since the height of the carriage is less, the mechanical moment arm between the datums on the print cartridge and the latch spring is less. More specifically, they are closer together during loading, operating, and unloading. Third, the latch on the present print cartridge is located behind the margin of the print cartridge where in prior cartridges the latch was located at the margin. This positioning reduces the mechanical moment arm even further. Thus, to achieve the same insertion and removal force as is present on larger, prior carriages, the force exerted by the latch spring must be increased. Prior solutions would have made the latch spring stouter, but as a spring gets thicker, it will not bend as far and still spring back. In addition, increasing the size of the latch spring is undesirable because the space available for the spring has been substantially reduced.

Thus, it is apparent from the foregoing that although there are many different latch spring designs for the carriages in facsimile machines, designing a latch spring for a low height facsimile printer presents many challenges.

SUMMARY OF THE INVENTION

Briefly and in general terms, an apparatus according to the invention includes a cantilever spring having a free end and an anchorable end. The spring is doubled back on itself to obtain a long effective length in a short space.

Other aspects and advantages of the invention will become apparent from the following detailed description, taken in conjunction with the accompanying drawings, illustrating by way of example the principles of the invention.

DESCRIPTION OF THE PREFERRED EMBODIMENT

Figure 1:
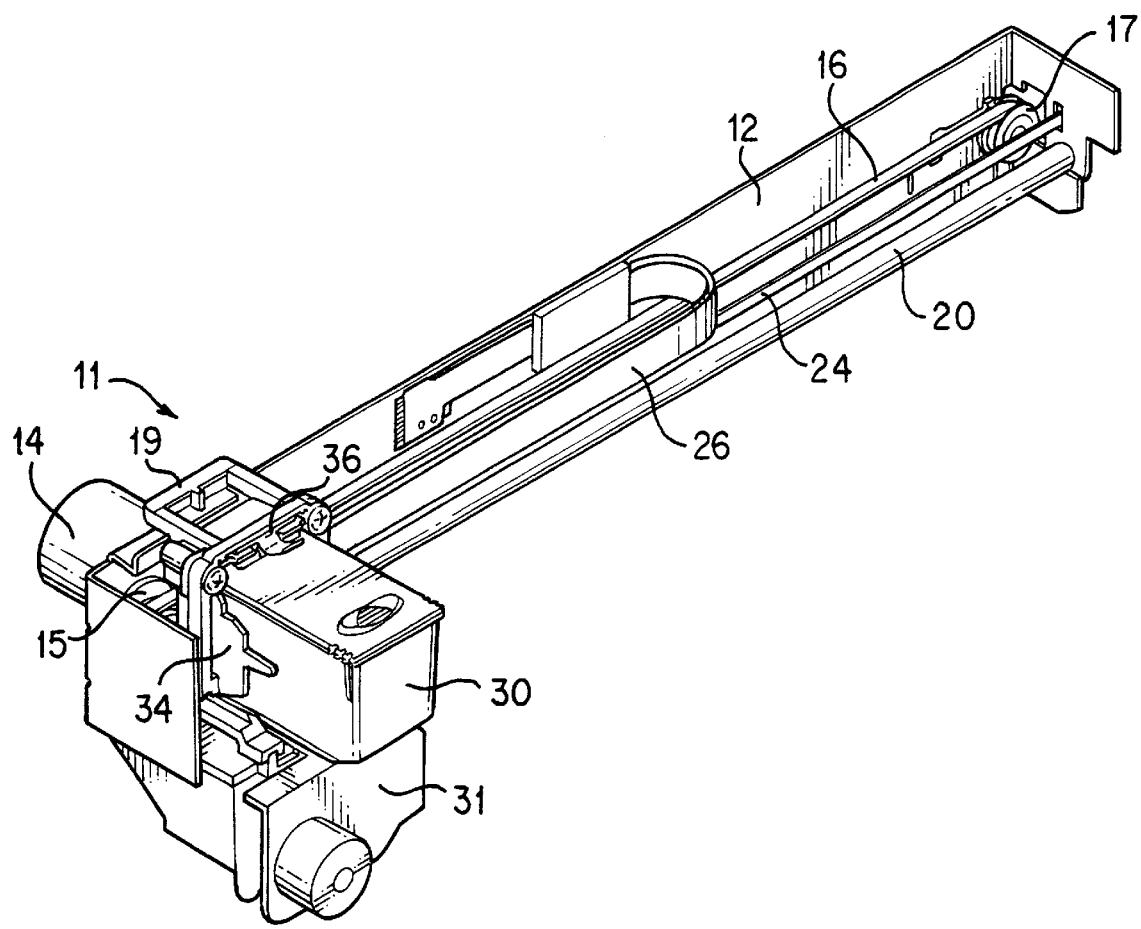
FIG. 1 is a perspective view of an ink jet printer mechanism for a facsimile machine embodying the principles of the invention.

As shown in the drawings for the purposes of illustration, the invention is embodied in a cantilever latch spring for a carriage for an ink jet print cartridge for a printer for a facsimile machine. The spring is doubled back on itself to achieve a long effective length in a short space.

The apparatus offers a simple solution, a low profile, and reproduces the forces and alignment between the carriage datums and the print cartridge datums that are present in larger, prior apparatus.

Figure 2:
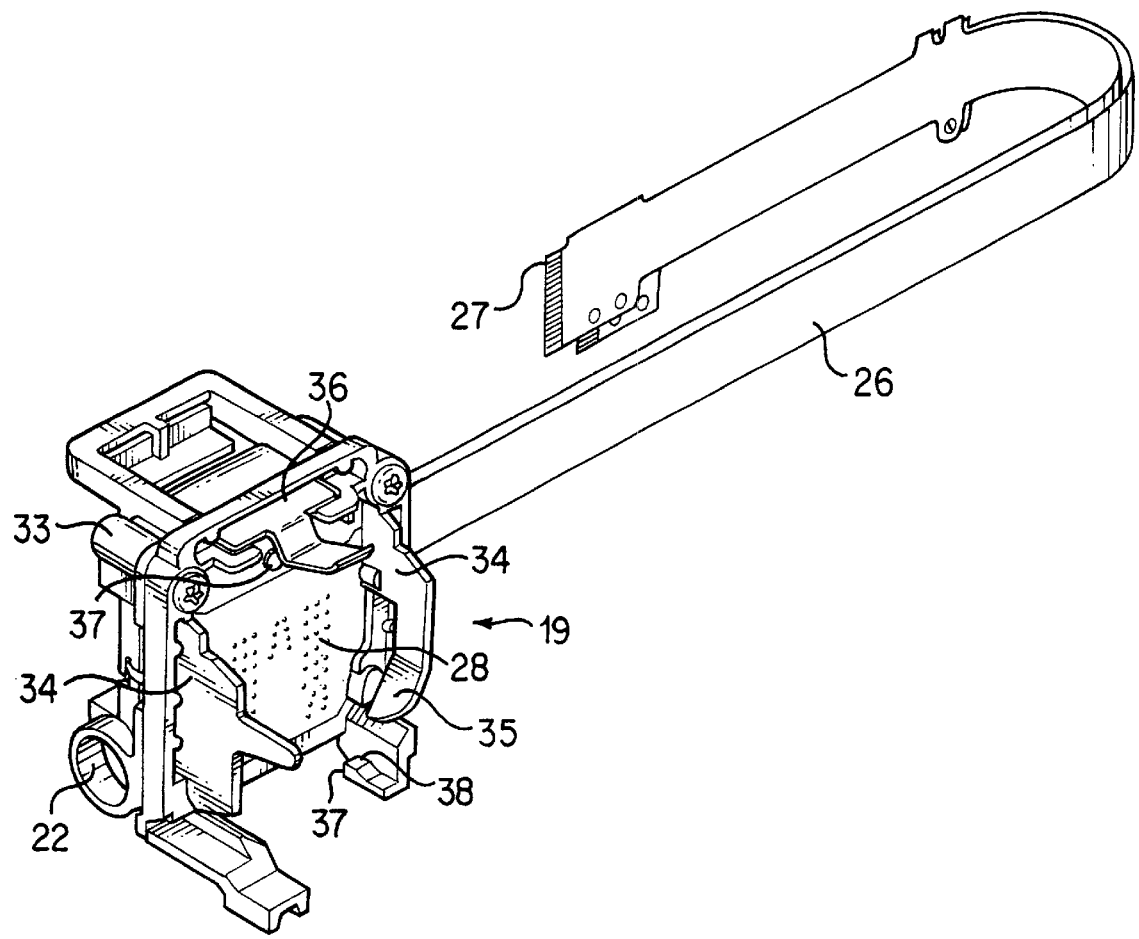
FIG. 2 is a perspective view of the carriage in the printer mechanism of FIG. 1.
Figure 3:
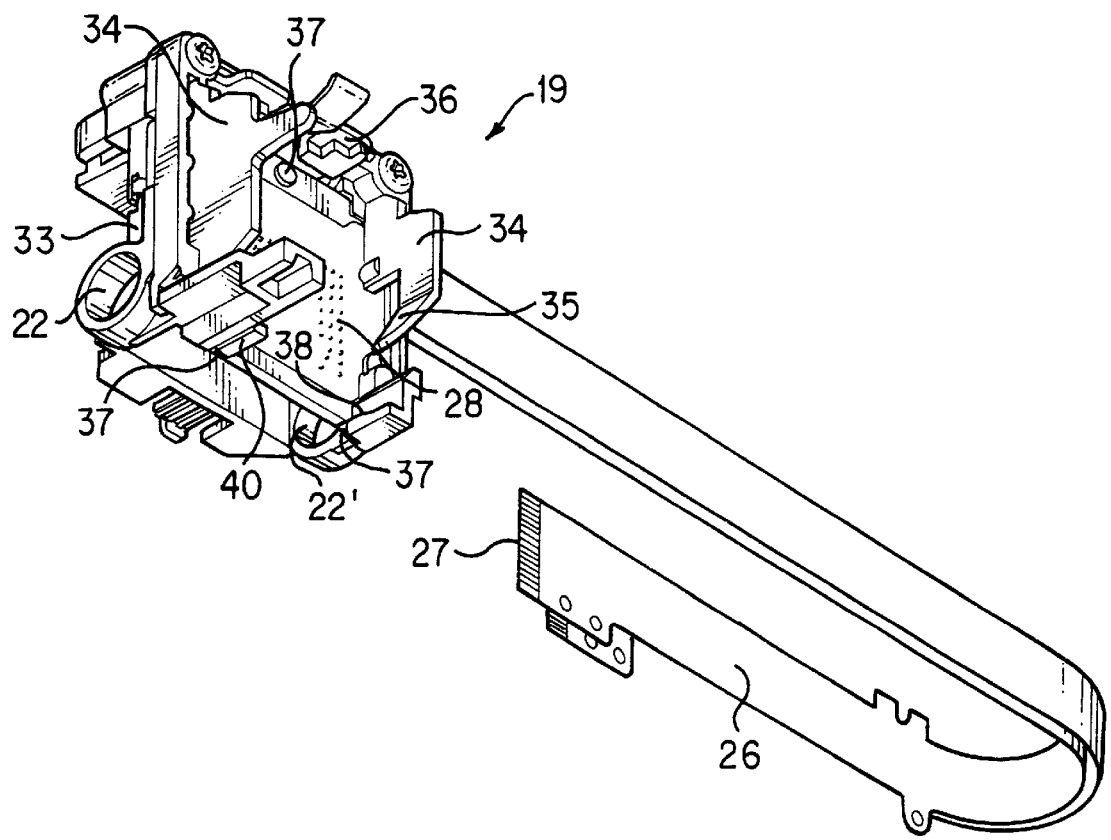
FIG. 3 is a perspective view of the carriage in the printer mechanism of FIG. 1.

Referring to FIG. 1, reference numeral 11 generally indicates a printer mechanism for a facsimile machine. The printer mechanism 11 includes a chassis 12 which provides the structural back bone of the apparatus because most of the components of the mechanism are mounted on it. Reference numeral 14 indicates a DC drive motor that is connected to a drive reduction gear train 15. The drive train 15 is, in turn, connected to a tooth gear belt 16 which is tensioned by a follower 17. The tooth gear belt 16 is physically attached to a carriage 19. The DC motor 14, drive train 15, and tooth gear belt 16 move the carriage 19 back and forth along a slider rod 20 which is parallel to the scan axis of the facsimile machine. The slider rod 20 is stationary with respect to the chassis 12. Referring to FIGS. 2 and 3, the carriage 19 is supported on the slider rod 20 and is constrained for 2-axis movement along the rod by two bushings 22, 22'.

Figure 8:
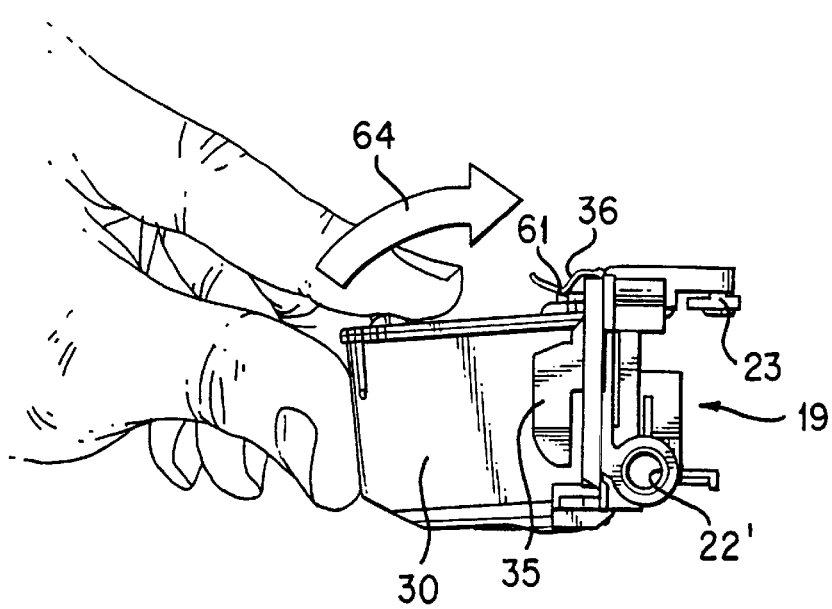
FIGS. 8, 9, and 10 are diagrammatic, side elevational views of the carriage of FIGS. 2 and 3.
Figure 9:
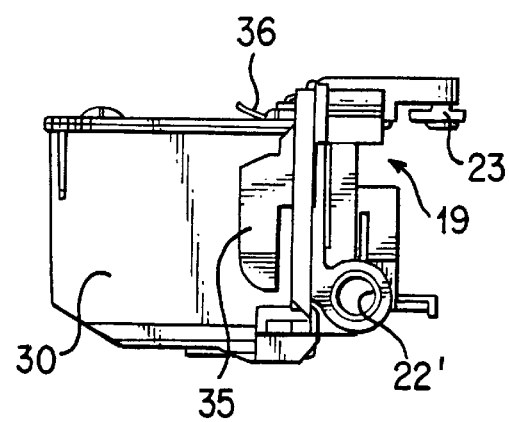
Figure 10:
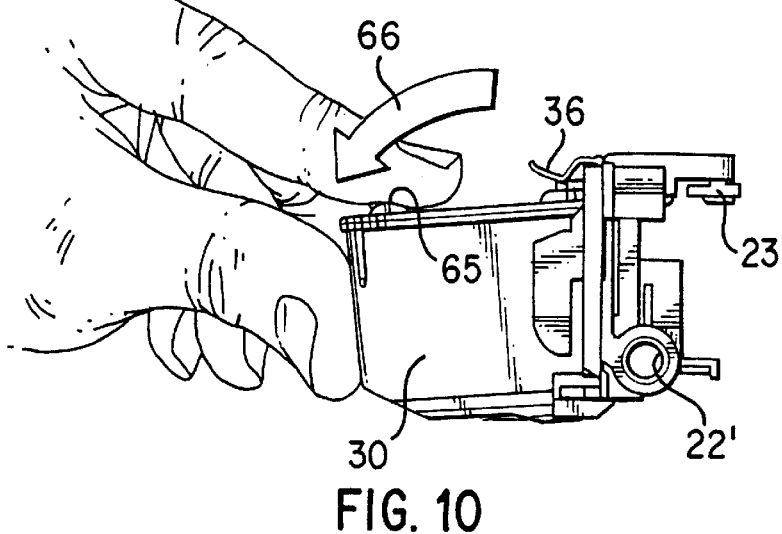

Referring to FIGS. 8, 9, and 10, located behind the carriage 19 is a rear carrier friction bearing 23. This friction bearing 23 rides on the chassis 12 and limits the rotation of the carriage 19 around the slider rod 20.

Referring to FIG. 1, as the carriage 19 is driven back and forth along the slider rod 20, the position of the carriage is sensed by a conventional encoder reader module (not shown) mounted on the rear of the carriage. The encoder reader module reads a stationary encoder strip 24 mounted on the chassis 12. The signals from the encoder reader module are sent to a circuit likewise not shown.

In FIG. 1 reference numeral 30 indicates an ink jet print cartridge that is received, retained, and aligned in the carriage 19 as described in detail below. The print cartridge 30 is maintained by a service station 31 that wipes the print cartridge during operation and caps the print cartridge during non-operation. When the printer mechanism has been turned off, the service station also locks the carriage 19 and the print cartridge 30 in place so the carriage will not slide back and forth.

In FIGS. 2 and 3, reference numeral 26 indicates a flexible interconnect which is a series of electrical circuits connecting the print cartridge 30, FIG. 1, with the printer electronics (not shown). During printing, electrical signals from the printer electronics travel through the interconnect 26 and fire the print cartridge 30 on command. The interconnect 26 has a terminated end 27 that plugs into a connector leading to the printer electronics. The interconnect 26 also leads to a pattern of bumps 28. The pattern of the bumps mirrors the layout of the conductor contact pads 29 on the TAB circuit on the print cartridge 30, FIG. 7. Behind the pattern of bumps 28 is a spring pad fabricated from an elastomer material. The spring pad has a plurality of posts on it that correspond to the locations of the bumps. The spring pad provides a reaction force behind the interconnect 26. As the print cartridge 30 is pushed against the interconnect 26 during loading, the spring pad pushes back, producing a force at the interface between the print cartridge 30 and the interconnect 26 and thereby insuring satisfactory electrical connections across the interface. The bumps 28, the spring pad, and the posts are further described in U.S. Pat. No. 4,706,097 by Harmon entitled "Near-linear Spring Connect Structure for Flexible Interconnect Circuits" dated Nov. 10, 1987.

Referring to FIGS. 2 and 3, the carriage 19 includes a carriage base 33 that houses the bushings 22, attaches to the tooth gear belt 16, FIG. 1, and anchors a latch spring 36 described in detail below. Rigidly connected to the carriage base 33 is a chute 34 that receives and retains the print cartridge 30. Located in one wall of the chute 34 is a side bias spring 35 that urges the print cartridge against the opposite wall of the chute and a tertiary carriage datum 40. The carriage further includes three primary carriage datums 37 and two secondary carriage datums 38. These datums 37, 38, and 40 are latched by complementary surfaces, the print cartridge datums 41, FIG. 7, on the print cartridge 30 and align the print cartridge with respect to the carriage 19 in all directions. In other words, the carriage datums define the X, Y, and Z planes that the print cartridge 30 seats against.

Figure 4:
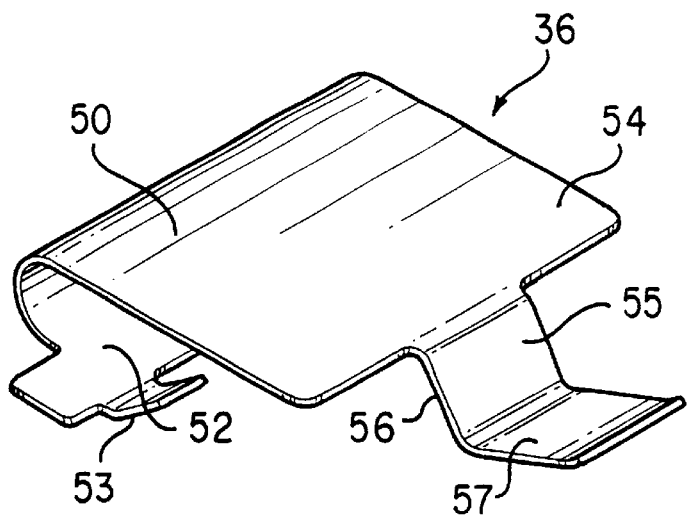
FIG. 4 is a perspective view of the latch spring in the carriage of FIGS. 2 and 3.
Figure 5:
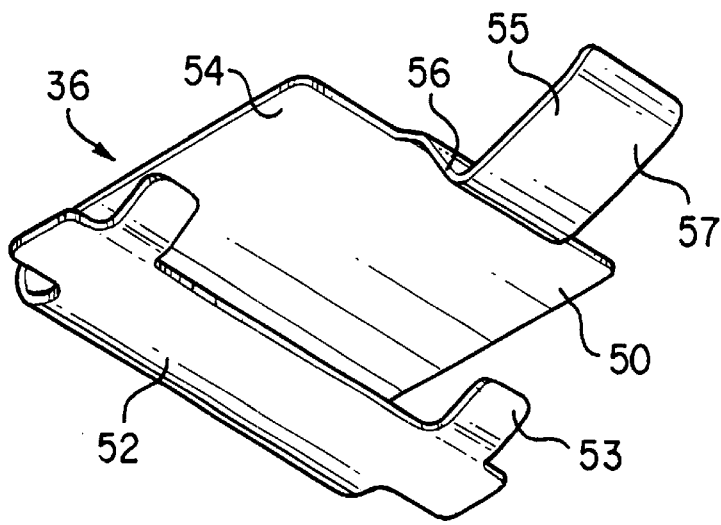
FIG. 5 is a perspective view of the latch spring in the carriage of FIGS. 2 and 3.
Figure 6:
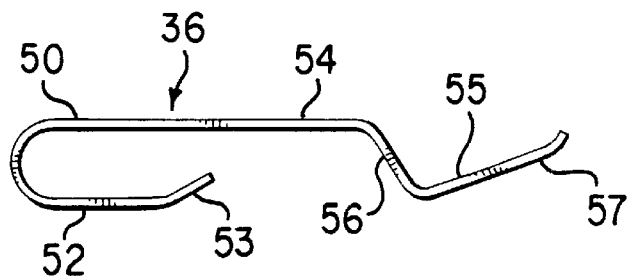
FIG. 6 is a side elevational view of the latch spring of FIGS. 4 and 5.

Referring to FIGS. 4, 5, and 6, the latch spring 36 is an elongate cantilever 50 fabricated from metal. The cantilever is doubled back on itself with a 180° turn so that the latch spring has a generally U-shaped lateral cross section as illustrated in FIG. 6. The cantilever 50 has an anchorable end 52 that terminates with two retention tabs 53. The retention tabs each engage a feature molded into the carriage base 33 of the carriage 19 and rigidly fix the anchorable end 52 of the latch spring 36 for flexing. The cantilever 50 also includes a free end 54 that extends apart from and beyond the anchorable end 52 as illustrated in FIG. 6. The long U-shaped configuration of the spring provides the force and the effective length necessary to produce a spring that is sufficiently stiff to provide the necessary reaction forces to retain a print cartridge 30 within the carriage 19 and yet is sufficiently long enough that the spring will not become bent beyond its yield point as a print cartridge 30 is inserted into the carriage 19.

Figure 7:
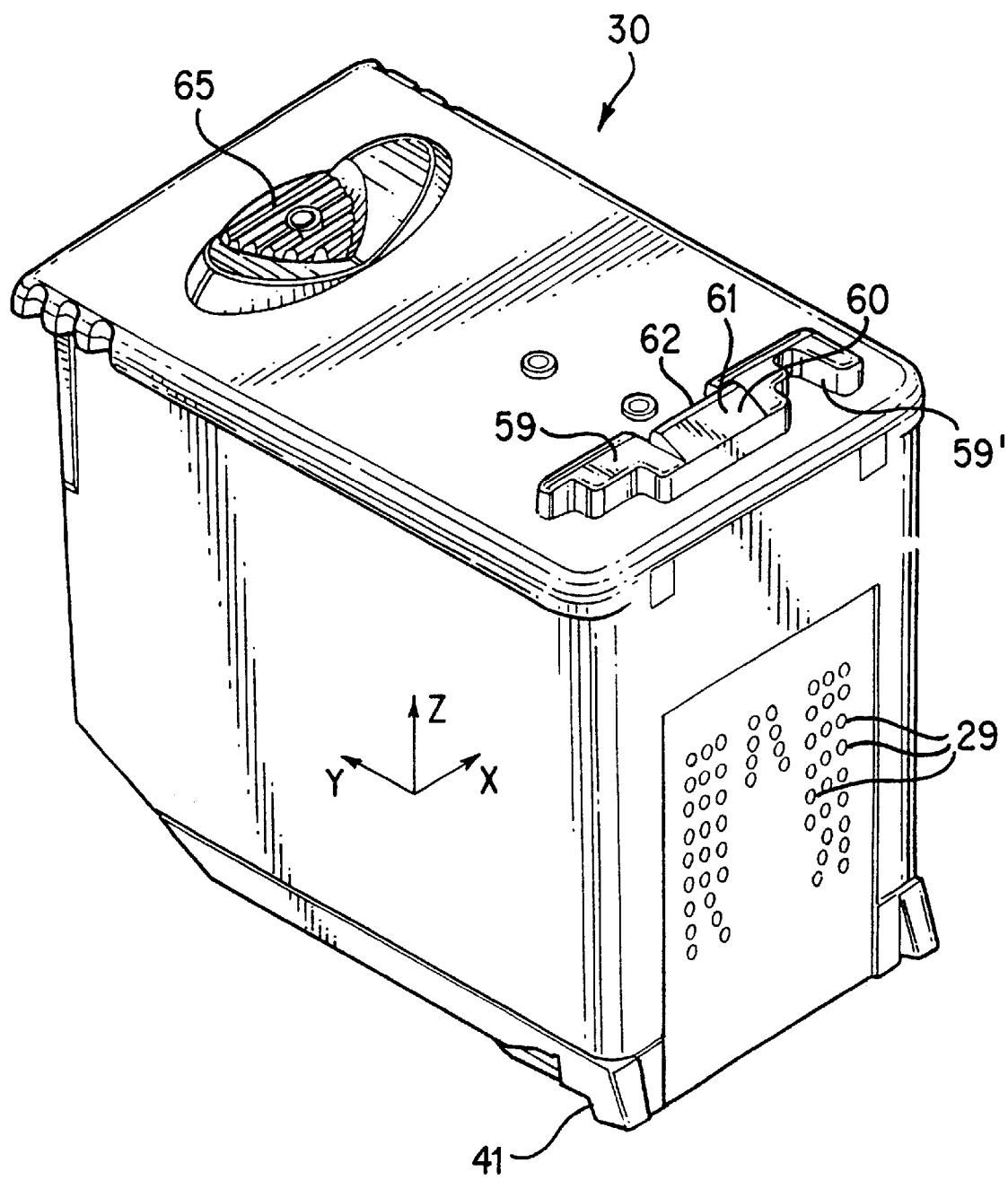
FIG. 7 is perspective view of the print cartridge in the printer mechanism of FIG. 1.

The free end 54 of the latch spring 36, FIGS. 4, 5, and 6, terminates in a narrow tongue 55. The tongue is narrow in order fit between the keying features 59, 59' on the print cartridge 30 as illustrated in FIG. 7. The tongue engages a latch 60, FIG. 7, located on the top wall of the print cartridge. The latch has an inclined latch ramp 61 and a latch wall 62 that is perpendicular to the top wall of the print cartridge.

The tongue 55 of the latch spring 36 comprises a medial portion 56 and a distal portion 57 and has a generally V-shaped lateral cross section as illustrated in FIG. 6. During the loading of a print cartridge, the distal portion 57 of the latch spring rides up the inclined latch ramp 61 on the print cartridge 30, FIG. 7. The angle of inclination of the distal portion 57 of the tongue 55 is a trade off between achieving the gentlest possible loading force while minimizing the length of the distal portion of the tongue 55. After loading and during operation, die medial portion 56 of the tongue engages the latch wall 62, FIG. 7 on the print cartridge 30. Because the medial portion is inclined, the vertical force produced by extending the latch spring 36 is translated into both horizontal and vertical forces. The horizontal force provides the interconnect force between the bumps 28, FIGS. 2 and 3 on the carriage base 33 and the contact pads 29 on the print cartridge 30, FIG. 7. The vertical force provides the force seating the print cartridge datums 41, FIG. 7 against the primary and secondary datums 37 and 38, FIGS. 2 and 3, and contributes to retention of the print cartridge 30, FIG. 7, in the carriage 19. The angle of inclination of the medial portion 56 from the horizontal as illustrated in FIG. 6 is a trade off between achieving retention of the print cartridge 30 in the carriage 19 with minimum spring strength and obtaining ease of removal of the print cartridge 30 from the carriage 19.

FIG. 8 illustrates the process of inserting a print cartridge 30 into a carriage 19. The bottom of the print cartridge is guided into the carriage such that the datums 41 at the front of the bottom wall of the print cartridge 30, as illustrated in FIG. 7, travel over the top of the carriage datums 37, 38, and 40 located in the bottom of the chute 34, FIGS. 2 and 3. The user applies a force horizontally at the top of the print cartridge and this force causes the print cartridge to rock forward in the direction indicated by the arrow 64. The latch spring 36 engages the latch ramp 61, FIG. 7, and the latch spring flexes upward, out of the way of print cartridge. The latch spring 36 also pushes downward on the print cartridge so that the datums 41, FIG. 7, on the print cartridge 30 begin to seat against the secondary carriage datums 38, FIGS. 2 and 3. Once the print cartridge passes a critical point, the latch spring 36 pulls the print cartridge forward into the carriage 19 and the datums on the print cartridge and the carriage seat against each other. Simultaneously the side bias spring 35 urges the print cartridge laterally against the tertiary datum 40, FIG. 3.

FIG. 9 illustrates the print cartridge 30 inserted into the carriage 19. The medial portion 56 of the tongue 55, FIG. 6, is seated against the latch wall 62, FIG. 7. The printer mechanism 11, FIG. 1, is ready for operation.

FIG. 10 illustrates the unlatching and removal of the print cartridge 30 from the carriage 19. The user presses down on the gripping surfaces 65 of the print cartridge and pulls the print cartridge out of the carriage. The print cartridge rocks backward in the direction of the arrow 66 and the latch spring 36 releases the latch 60 on the print cartridge. Once the latch is disengaged, the print cartridge is free of the carriage 19.

Although specific embodiments of the invention have been described and illustrated, the invention is not to be limited to the specific forms or arrangement of parts so described and illustrated. The invention is limited only by the claims.

We claim:

1. A spring for latching a print cartridge in a carriage, said spring comprising: a cantilever spring body of elongate metallic ribbon-like shape extending horizontally and being of U-shape in lateral view, with said U-shape having a pair of generally horizontal legs, said spring body having a major axis, and with a free end aid an anchorable end at respective ends of said pair of horizontal legs, whereby said spring is doubled back on itself, thereby obtaining a long effective length in a short space.

2. A spring for latching a print cartridge in a carriage, comprising: a cantilever spring having a major axis and with a free end and an anchorable end, said spring being doubled back on itself thereby obtaining a long effective length in a short space;
   wherein the cantilever spring has a U-shaped lateral cross section;
   further including a tongue at the free end, said tongue having a medial portion and a distal portion, said medial portion being inclined with respect to the major axis of the cantilever for engaging a latch feature on a print cartridge.

3. The spring of claim 2 further including a carriage on which the spring is mounted and wherein the distal portion of the tongue is inclined opposite to the medial portion so that the spring is opened by a print cartridge when the print cartridge is inserted into the carriage.

4. The spring of claim 2 further including a tongue at the free end, said tongue having a medial portion and a distal portion, said medial portion and said distal portion have a V-shaped lateral cross-section for both opening the spring and engaging a latch feature on a print cartridge.

5. A spring for latching a print cartridge in a carriage, said spring comprising: a cantilever spring body of elongate ribbon shape, said spring body being of U-shape in lateral view, and having a major axis and with a free end and an anchored end at opposite ends of and on separate legs of said U-shaped body, said anchored end being mounted on a carriage, said free end extending apart from and beyond the anchored end, thereby obtaining a long effective length in a short space.

6. In combination in a device for performing ink jet printing:
   a carriage for receiving and carrying an ink jet print cartridge, said carriage presenting an array of electrical contact bumps for connecting with an array of contact pads on tie ink jet print cartridge, and also having an arrangement of datums for engaging matching datums of the print cartridge and relatively positioning the ink jet print cartridge in three dimensions;
   a latch spring carried by said carriage for engaging a latch of the ink jet print cartridge, which latch includes an angulated ramp surface leading to a generally vertical wall surface, and said ramp and wall surfaces cooperating to define a cusp at the cartridge latch; said latch spring simultaneously providing to said print cartridge both a horizontal force to forcefully engage the contact pads of the print cartridge with the contact bumps of the carriage, and a vertical force for engaging the datums of the print cartridge with the datums of the carriage;
   said latch spring including:
      an elongate spring body of U-shape in lateral view with said U-shape having a pair of generally horizontal legs, one leg of said U-shape body terminating in an anchorable feature anchoring to said carriage, and a second of said legs of said U-shape body including a free end portion terminating in a tongue with an angulated medial portion leading to an angulated distal portion, the medial portion and distal portion defining a V-shape in lateral view;
      whereby, said medial portion angularly engages with said latch cusp to simultaneously provide both horizontal and vertical forces to said print cartridge at said latch.

7. The combination of claim 6 wherein said second leg of said U-shaped body disposes said free end portion apart from and beyond said anchorable feature.

8. The combination of claim 6 wherein said elongate spring body is generally of flattened metallic ribbon shape, and said U-shape provides both sufficient spring rate to retain said print cartridge at said carriage, and sufficient length of said spring body so that said metallic ribbon is not stressed beyond its elastic limit by insertion or removal of said print cartridge from said carriage.

9. The combination of claim 6 wherein said anchorable feature includes a pair of laterally spaced apart retention tabs.

10. A latch spring to be carried by a carriage of a device for performing ink jet printing so as to receive and retain an inkjet print cartridge upon said carriage by simultaneously providing to said print cartridge both a horizontal force to forcefully engage contact pads of the print cartridge with contact bumps of the carriage, and a vertical force for engaging datums of the print cartridge with datums of the carriage;
    said latch spring including:
       an elongate metallic ribbon-like spring body of horizontally extending U-shape in lateral view, with said horizontally extending U-shape having a pair of generally horizontal legs, a lower and shorter one leg of said pair of legs terminating in an anchorable end portion having a laterally spaced apart pair of retention tabs for anchoring to the carriage, and an upper and longer second of said pair of legs including a free end portion disposed beyond and apart from said anchorable end portion, and said free end terminating in a tongue with an angulated medial portion leading to an angulated distal portion, the medial portion and distal portion defining a V-shape in lateral view;
       whereby, said medial portion angularly engages with a latch of the print cartridge to simultaneously provide both horizontal and vertical forces to said print cartridge.

11. The latch spring of claim 10 wherein said elongate spring body is sufficiently stiff so as to retain said print cartridge at said cartridge, and sufficiently long so that said metallic ribbon-like body is not stressed beyond its elastic limit by insertion or removal of a print cartridge into or from the carriage.

* * * * *